US 8,658,968 B2

(12) United States Patent
Galford

(10) Patent No.: US 8,658,968 B2
(45) Date of Patent: Feb. 25, 2014

(54) NUCLEAR LOGGING TOOL CALIBRATION SYSTEM AND METHOD

(75) Inventor: James E. Galford, Missouri City, TX (US)

(73) Assignee: Halliburton Energy Services, Inc., Houston, TX (US)

(*) Notice: Subject to any disclaimer, the term of this patent is extended or adjusted under 35 U.S.C. 154(b) by 270 days.

(21) Appl. No.: 13/120,338

(22) PCT Filed: Jul. 31, 2009

(86) PCT No.: PCT/US2009/052356
§ 371 (c)(1),
(2), (4) Date: Mar. 22, 2011

(87) PCT Pub. No.: WO2010/047865
PCT Pub. Date: Apr. 29, 2010

(65) Prior Publication Data
US 2011/0186721 A1   Aug. 4, 2011

Related U.S. Application Data

(60) Provisional application No. 61/107,008, filed on Oct. 21, 2008.

(51) Int. Cl.
*G01V 5/10* (2006.01)
*G01D 18/00* (2006.01)
*G12B 13/00* (2006.01)
*G01V 5/00* (2006.01)

(52) U.S. Cl.
USPC ............. 250/269.6; 250/252.1; 250/261

(58) Field of Classification Search
USPC ............. 250/252.1, 261, 269.6
See application file for complete search history.

(56) References Cited

U.S. PATENT DOCUMENTS

| 3,156,822 A | 11/1964 | Tittman |
| 3,219,820 A | 11/1965 | Hall |
| 3,932,747 A | 1/1976 | Sherman |

(Continued)

FOREIGN PATENT DOCUMENTS

| GB | 2 427 024 A | 12/2008 |
| WO | 2007015953 A2 | 2/2007 |

OTHER PUBLICATIONS

Schwietzer, J.S., Manente, R.A., Hertzog, R.C., "Gamma Ray Spectroscopy Tool; Environmental Corrections," Journal of Petroleum Technology (Sep. 1984) 1527-1534.

(Continued)

*Primary Examiner* — David Porta
*Assistant Examiner* — Abra Fein
(74) *Attorney, Agent, or Firm* — Mark E. Scott; Conley Rose, P.C.

(57) ABSTRACT

A nuclear logging tool calibration system and method. At least some of the illustrative embodiments are methods including placing a logging tool proximate to a volume to be tested (the logging tool comprising a neutron source and a gamma detector), accumulating a spectrum of gammas by the gamma detector (the gammas created responsive to neutron irradiation of the volume by the neutron source), and then adjusting gain of a photomultiplier tube of the gamma detector. The adjusting is responsive to count rate in an overflow bin of the spectrum, where the overflow bin accumulates count rate of gammas received by the gamma detector that have energy above a predetermined energy.

11 Claims, 4 Drawing Sheets

(56) References Cited

U.S. PATENT DOCUMENTS

| | | | |
|---|---|---|---|
| 4,078,174 | A | 3/1978 | Goldman |
| 4,661,701 | A | 4/1987 | Grau |
| 4,736,204 | A | 4/1988 | Davison |
| 4,766,543 | A | 8/1988 | Schmidt |
| 4,918,314 | A | 4/1990 | Sonne |
| 4,928,088 | A | 5/1990 | Jorion |
| 4,992,787 | A | 2/1991 | Helm |
| 5,021,653 | A | 6/1991 | Roscoe |
| 5,182,955 | A | 2/1993 | Minette |
| 5,406,078 | A | 4/1995 | Jacobson |
| 5,528,029 | A | 6/1996 | Chapellat |
| 5,600,135 | A * | 2/1997 | Jacobson ............ 250/261 |
| 5,814,988 | A | 9/1998 | Itskovich |
| 5,817,265 | A | 10/1998 | Gendreau |
| 5,817,267 | A | 10/1998 | Covino |
| 5,825,024 | A | 10/1998 | Badruzzaman |
| 5,982,838 | A * | 11/1999 | Vourvopoulos ............ 376/159 |
| 6,124,590 | A | 9/2000 | Mickael |
| 6,215,304 | B1 | 4/2001 | Slade |
| 6,246,236 | B1 | 6/2001 | Poitzsch |
| 6,831,571 | B2 | 12/2004 | Bartel |
| 6,851,476 | B2 | 2/2005 | Gray |
| 6,967,589 | B1 | 11/2005 | Peters |
| 7,081,616 | B2 | 7/2006 | Grau |
| 7,253,402 | B2 | 8/2007 | Gilchrist |
| 7,294,829 | B2 | 11/2007 | Gilchrist |
| 7,361,887 | B2 | 4/2008 | Tricka |
| 7,365,307 | B2 | 4/2008 | Stoller |
| 7,365,308 | B2 | 4/2008 | Tricka |
| 7,372,018 | B2 | 5/2008 | Tricka |
| 2005/0139759 | A1 | 6/2005 | Pitts |
| 2007/0023626 | A1 | 2/2007 | Riley |

OTHER PUBLICATIONS

Hertzog, R., et al.: "Geochemical Logging with Spectrometry Tools," SPE Formation Evaluation (Jun. 1989) 153-162.

Pemper, R., et al.: "A New Pulsed Neutron Sonde for Derivation of Formation Lighology and Mineralogy," paper SPE 102770 presented at the 2006 SPE Annual Technical Conference and exhibition, San Antonio, TX, Sep. 24-27.

Briesmeister, J.F., Editor 2000, "MCNP—A General Monte Carlo N-Particle Transport Code Version 4C," LA-13709-M.

L.A. Jacobson, et al. "Intrinsic Capture Cross-Section and Porosity Transform for the TMD-L Pulsed Nuetron Capture Tool" SPE 30597—Oct. 1995.

A. Badruzzaman, et al. "Is Accurate Gas/Steam Determination Behind Pipe Feasible with Pulsed Neutron Measurements"—SPE 110098—Oct.-Nov. 2007.

A. Badruzzaman, et al. "Multi-Sensor Through-Casing Density and Saturation Measurement Concepts with a Pulsed Neutron Source: A Modeling Assessment"—SPE 89884—Nov. 2004.

A Badruzzaman, et al. "Progress and Future of Pulsed Neutron Technology in Oil Field Management"—SPE 49228—Sep. 1998.

R. Odom, et al. "Design and Initial Field-Test Results of a New Pulsed-Neutron Logging System for Cased Reservoir Characterization" SPWLA 49th Annual Logging Symposium, May 25-28, 2008.

International Search Report and Written Opinion for PCT Patent Application No. PCT/US09/52356, filed Jul. 31, 2009.

* cited by examiner

NUCLEAR LOGGING TOOL CALIBRATION SYSTEM AND METHOD

CROSS-REFERENCE TO RELATED APPLICATIONS

This application claims the benefit of: provisional application Ser. No. 61/107,008, filed Oct. 21, 2008, titled "Nuclear Logging Tool Calibration System and Method"; and PCT application serial number PCT/US2009/052356, filed Jul. 31, 2009, titled "Nuclear Logging Tool Calibration System and Method". Both applications are incorporated by reference as if reproduced in full below.

BACKGROUND

Pulsed-neutron nuclear logging tools operate by releasing high energy neutrons, on the order of 14 Mega-electron Volts (MeV), into the borehole and formation. The neutrons create gamma particles or gamma rays (hereafter just gammas) by one of several of interactions with the surrounding atoms: 1) the neutrons inelastically collide with atomic nuclei and thereby create gammas (known as inelastic gammas); and 2) when a neutron loses energy (possibly through the inelastic collisions or by other means) the neutron is captured by the nucleus of a nearby atom and in the process a gamma is emitted (known as a capture gamma). The atoms with which the neutrons collide and/or the neutrons are captured can be determined by the energy (or frequency) of the gammas produced.

The energy of the gammas produced is determined by a scintillation crystal in operational relationship to a photomultiplier tube. In particular, gammas incident upon and/or within the scintillation crystal create flashes of light, with the intensity of each flash of light based on the energy of the gamma. The photomultiplier tube detects the flashes of light and their intensity for analysis. The photomultiplier tube, along with electronics to record the arrivals, may be referred to as a multi-channel pulse-height analyzer or alternatively as a spectrometer. Detected gammas are assigned to multi-channel pulse-height analyzer channels via a linear relationship, Channel=gain×Energy+Channel offset. Deviations from the desired calibration of the multi-channel pulse-height analyzer can occur for a variety of reasons. For example, voltage drifts caused by changes in the electronics with changes in temperature can lead to deviations in both gain and channel offset. Similarly, light output from most scintillation crystals varies with changes in scintillation crystal temperature which, in turn, affects the overall gain of the system. In addition, aging of the photomultiplier cathode can cause the gain to change over time. For some detector systems a phenomenon known as photomultiplier fatigue occurs with large counting rate changes over short intervals of time. It is common for the calibration to change because of some or all of these effects.

Any technique which provides more accurate and/or easier to achieve calibration of a neutron-induced gamma spectroscopy logging tool would provide competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Figure 2:
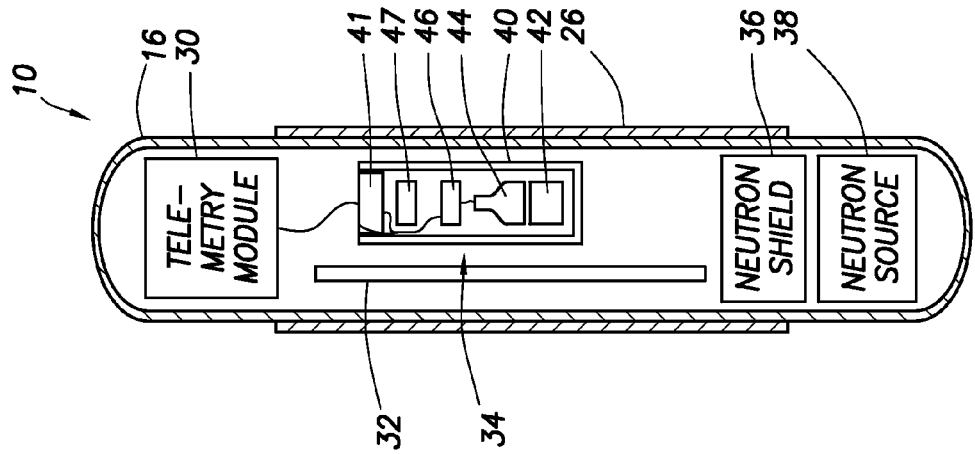
FIG. 2 shows a simplified internal view of a logging tool in accordance with at least some embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Spectrum" shall mean a plurality of count values, one count value for each of a plurality of energy channels or bins. Each count value may be an absolute count value (i.e., the total number of gammas that arrived in the measurement period with requisite energy), or each count value may be a count rate (i.e., the rate of gamma arrivals with requisite energy).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A variety of techniques exist in the related art to compensate for departures from desired calibration of multi-channel pulse-height analyzers. For example, in some cases particular photopeaks are monitored, and the gain and/or offset are adjusted to ensure the particular photopeaks are in the proper channel or bin. However, the photopeaks utilized may not be present in every situation encountered down hole. Another example of a technique for calibration is to include a second radiation source within the tool, and thus monitor and calibrate based on the photopeaks created based on the radiation from the second radiation source. However, not only do such techniques increase the cost and complexity of the tool, in some cases the sources used are low energy sources and calibrating the multi-channel pulse-height analyzer based solely on detected energy at the very low end of the spectrum (e.g., 60 Kilo-electron Volts (KeV)) may lead to significant error at the high end of the energy spectrum (e.g., 9.5 Megaelectron Volt (MeV) and below). Rather than attempting to identify a particular photopeak, whose actual location may be skewed significantly because of lack of calibration, or which photopeak may not even be present in the particular situation, the various embodiments are directed to a calibration technique that is based on the gamma count rates in a particular channel or bin of the received spectrum (e.g., the overflow bin), and adjustments are initially made to photomultiplier gain, and in some cases offset, based on the gamma count rates in the particular bin. The specification now turns to a discussion of an illustrative logging tool, the various components of a spectrometer, and then a method in accordance with the various embodiments.

Figure 1:
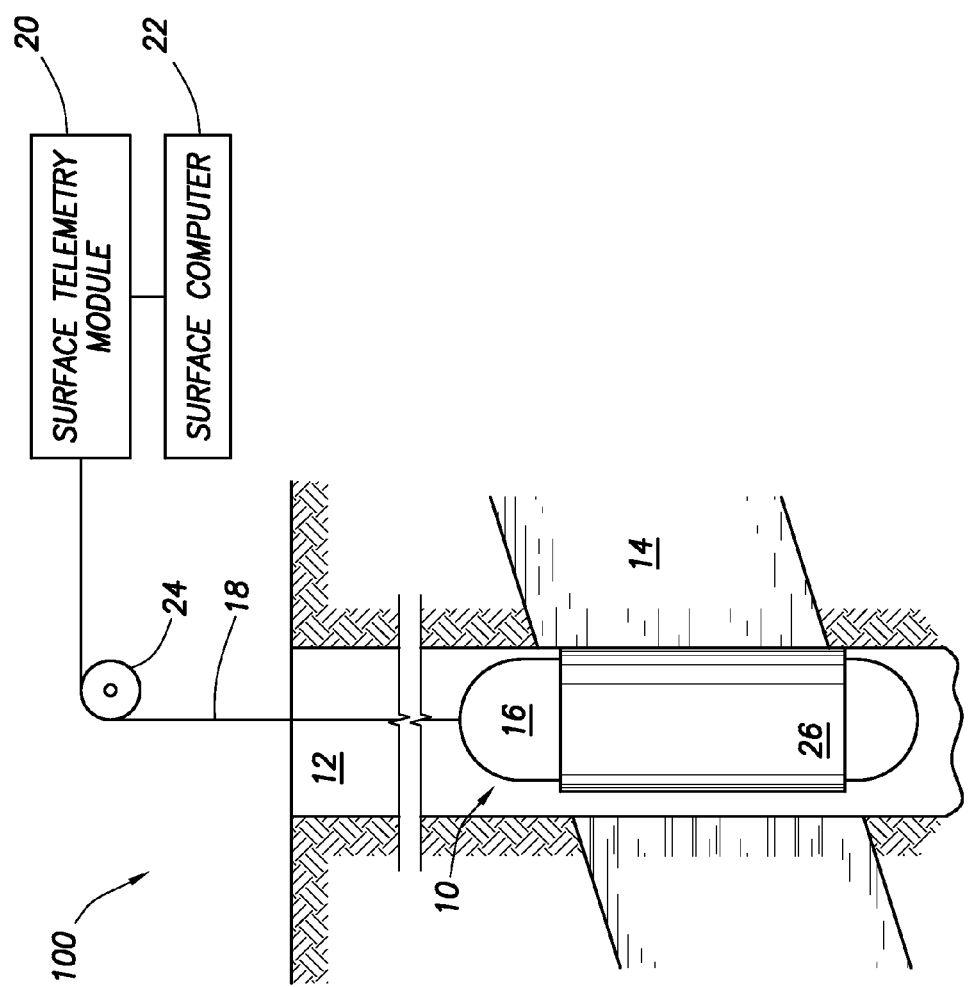
FIG. 1 shows system in accordance with at least some embodiments.

FIG. 1 illustrates a nuclear logging system 100 constructed in accordance with at least some embodiments. In particular, the system 100 comprises a nuclear logging tool 10 which may be placed within a borehole 12 proximate to a formation 14 of interest. The tool 10 comprises a pressure vessel 16 within which various subsystems of the tool 10 reside, and in particular embodiments the pressure vessel 16 is suspended within the borehole 12 by a cable 18. Cable 18, in particular embodiments a multi-conductor armored cable, not only provides support for the pressure vessel 16, but also communicatively couples the tool 10 to a surface telemetry module 20 and surface computer 22. The tool 10 may be raised and lowered within the borehole 12 by way of the cable 18, and the depth of the tool 10 within the borehole 12 may be determined by a depth measurement system 24 (illustrated as a depth wheel). In some embodiments, the pressure vessel 16 is at least partially covered with a thermal neutron adsorptive coating 26 (the thickness of which is exaggerated for clarity of the figure). In a particular embodiment, the pressure vessel 16 is composed of materials being predominantly iron or at least 15% chromium by weight. Examples of such materials are stainless steel alloys as well as MP35N® alloys, where MP35N® alloys are available from SPS Technologies, Inc of Jenkintown, Pa. Other metallic formulations of the pressure vessel 16 may be equivalently used.

FIG. 2 shows a simplified cross-sectional view of the nuclear logging tool 10 to illustrate some of the internal components. FIG. 2 illustrates the pressure vessel 16 houses components such as the telemetry module 30, borehole shield 32, gamma detector 34, neutron shield 36 and neutron source 38. Any neutron source capable of producing and/or releasing neutrons with sufficient energy may be used. While the gamma detector 34 is shown above the neutron source 38, in other embodiments the gamma detector 34 is below the neutron source 38. Moreover, multiple gamma detectors may be used. The gamma detector 34 detects arrival of, and energy of, gammas created by interactions of neutrons with atoms both in the formation 14, as well as atoms that make up the various components of the logging tool 10. In at least some embodiments, the gamma detector 34 comprises a metallic Dewar flask 40 sealed by a stopper 41, and within the Dewar flask 40 reside a scintillation crystal 42 (e.g., a 3 inch by 4 inch bismuth germinate scintillation crystal), a photomultiplier tube 44 in operational relationship to the crystal 42, a processor 46 coupled to the photomultiplier tube 44, and eutectic material 47. As gammas are incident upon/within the scintillation crystal 42, the gammas interact with the crystal 42 and flashes of light are emitted. Each flash of light itself is indicative of an arrival of a gamma, and the intensity of the light is indicative of the energy of the gamma. The output of the photomultiplier tube 44 is proportional to the intensity of the light associated with each gamma arrival, and the processor 46 quantifies the output as gamma energy and relays the information to the surface computer 22 by way of the telemetry module 30.

In order to reduce the irradiation of the gamma detector 34 by energetic neutrons from the neutron source 38, the neutron shield 36 separates the neutron source 38 from the gamma detector 34. The energetic neutrons are focused to some extent toward the side of the tool 10 that contacts with the borehole wall, but because of the speed of energetic neutrons (e.g., 14,000 kilometers/second or more), and because of collisions of the neutrons with atomic nuclei that change the direction of movement of the neutrons, the neutrons produce a neutron flux around the logging tool 10 that extends into the formation 14.

The neutrons interact with atoms by way of inelastic collisions and/or thermal capture. In the case of inelastic collisions, a neutron inelastically collides with an atomic nuclei, and in the process a gamma is created (an inelastic gamma) and the energy of the neutron is reduced. The neutron may have many inelastic collisions with atomic nuclei, each time creating an inelastic gamma and losing energy. At least some of the gammas created by the inelastic collisions are incident upon the gamma detector 34. One or both of the time of arrival of a particular gamma, and its intensity, may be used to determine the type of atom with which the neutron collided, and thus parameters of the formation 14. For example, gammas associated with inelastic collisions may be used to determine formation properties such as bulk density and carbon-oxygen ratio.

After one or more inelastic collisions (and corresponding loss of energy), a neutron reaches an energy known as thermal energy (i.e., a thermal neutron). At thermal energy, a neutron can be captured by atomic nuclei. In a capture event, however, the capturing atomic nucleus enters an excited stated, and the nucleus later transitions to a lower energy state by release of energy in the form a gamma (known as a thermal gamma). At least some of the thermal gammas created by thermal capture are also incident upon the gamma detector 34. One or both of the time of arrival of a particular gamma, and its intensity, may be used to determine the type of atom into which the neutron was captured, and thus parameters of the formation 14. For example, gammas associated with thermal capture may be used to determine the formation lithology.

However, production of inelastic gammas and capture gammas is not limited to atoms residing within the formation. Atoms of the borehole fluid, and atoms that makeup the elements of the tool 10 also produce inelastic gammas and capture gammas, and which gammas may be incident upon the gamma detector 34. Still referring to FIG. 2, in order to reduce the number of gammas created by interaction of neutrons with the borehole fluid reaching the gamma detector 34 from the borehole side, in some embodiments the tool 10 comprises a shield 32 of a high density material.

Figure 3:
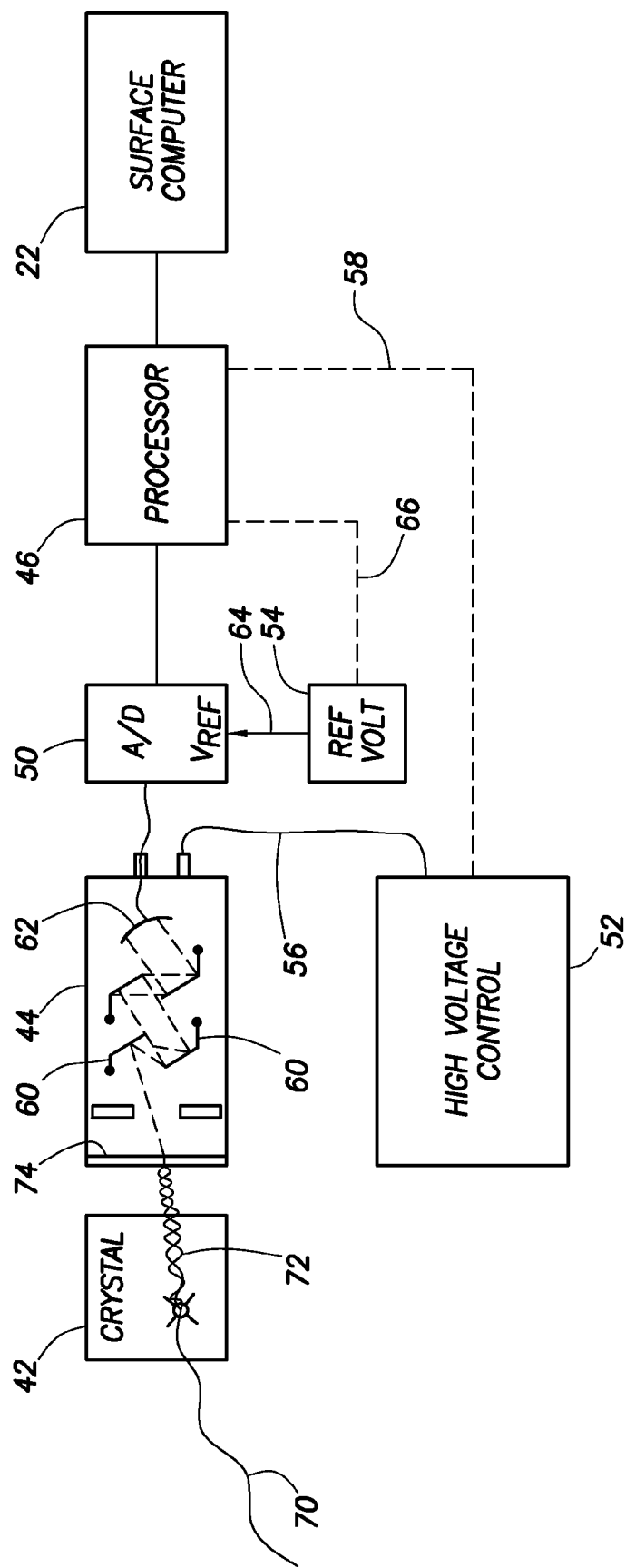
FIG. 3 shows components of an illustrative multi-channel pulse-height analyzer in accordance with at least some embodiments.

FIG. 3 illustrates in greater detail the various components that make up a multi-channel pulse-height analyzer in accordance with at least some embodiments. In particular, from FIG. 2 the scintillation crystal 42, photomultiplier tube 44, and downhole processor 46 are shown, along with surface computer 22 from FIG. 1. In addition, FIG. 3 illustrates analog-to-digital (A/D) device 50, high voltage control device 52 and reference voltage control device 54. Skipping for now calibration, during operation the processor 46 turns on and sets an output voltage from the high voltage control device 52. The high voltage from the high voltage control device 52 may be applied to the voltage input of the photomultiplier tube 44 by way of one or more signal lines 56. The control voltage set point may be communicated from the processor 46 and/or surface computer 22 to the voltage control device 52 as illustrated by dashed line 58. The high voltage is applied to one more electrodes of the tube 44, and in particular may be applied to one or more dynodes 60 (with the voltages for at least some of the dynodes set by a resistor network). The high voltage applied to the tube 44 controls the gain of the tube 44.

The A/D device 50 is coupled to and reads voltages on anode 62 of the photomultiplier tube 44. The A/D device 50 converts the analog voltages induced on the anode 62 to a digital format for use by the processor 46 and/or surface computer 22. Analog-to-digital conversion, such as performed by the A/D device 50, may be a conversion relative to a voltage reference. In the illustrative embodiments of FIG. 3, the voltage reference is provided by the reference voltage control device 54, which provides the reference voltage to the A/D device 50 by way of signal line 64. The reference voltage set point may be communicated from the processor 46 and/or surface computer 22 to the reference voltage control device 54, as illustrated by dashed line 66. In most cases, the reference voltage supplied to the A/D converter 50 will be at or near ground and/or common potential, but variances from ground and/or common potential may be used for calibration purposes.

Gammas incident upon the crystal 42, such as a gamma illustrated by line 70, interact with the crystal 42 to produce a flash of light, the intensity of the light a function of the energy of the gamma. A portion of the light created is incident upon a photocathode 74, as illustrated by line 72. The photocathode 74 produces one or more electrons in response to incident light, and the electrons produced by the photocathode 74 responsive to the light 72 interact with the dynodes 60, with each interaction increasing the number of electrons propagating toward the anode 62. The electrons striking the anode 62 create a voltage detected by the A/D device 50, with the voltage derived being a function of the gain of the tube. Thus, each gamma arrival is converted to a voltage reading whose amplitude is proportional to the energy of the arriving gamma.

Although it may be possible to perform formation spectroscopy by taking into account the energy of each gamma detected, in particular embodiments the arrivals are tracked based on energy channels or "bins". That is, rather than keeping track of the energy of each gamma arrival, the energy spectrum of interest is divided into bins, and the rate of arrivals in each bin is used, rather than the specific energy of each arrival. For example, in some embodiments 256 bins (numbered bin 0 to bin 255) are used, with each bin spanning about 37.3 KeV. Thus, bin 0 is incremented for each detected gamma having an energy of between 0 and about 37.3 KeV, bin 1 is incremented for each detected gamma having an energy between about 37.4 and about 74.6 KeV, and so on, with bin 254 being incremented for each detected gamma having an energy of between 9.462 and 9.5 MeV. In accordance with the various embodiments, bin 255 is incremented for each detected gamma having an energy above 9.5 MeV. As discussed more below, bin 255 may be referred to as the "overflow bin", and the overflow bin plays a part in calibration of the multi-channel pulse-height analyzer in accordance with the various embodiments. Moreover, while it may be possible to perform formation spectroscopy by taking into account the absolute count in each bin, in accordance with at least some embodiments the arrival rate (e.g., counts per second) within each bin is used. Arrival rate may be equivalently referred to as count rate.

In accordance with the various embodiments, calibration of the multi-channel pulse-height analyzer is performed with the logging tool 10 proximate to a test volume (e.g., an actual formation, or shop fixture which simulates a formation). Initially the high voltage applied to the photomultiplier tube 44 (i.e., the gain of the photomultiplier tube) is set or adjusted to be different than an expected final voltage setting, and in particular embodiments initially the voltage is set well below the expected final voltage setting. Coarse adjustments are made to the high voltage based on the count rate in the overflow bin. Once the count rate in the overflow bin reaches a predetermined window (e.g., between 15 and 100 counts per second for some tools), further adjustments are made after mathematical analysis. Moreover, the calibration may take place with the logging tool 10 proximate to any formation, even if the geochemical makeup is unknown. Further still, the further adjustments may be performed at any point during a logging run, and thus portions of the method may be used to compensate for changes in gain and/or channel offset that occur during logging operations.

Figure 4:
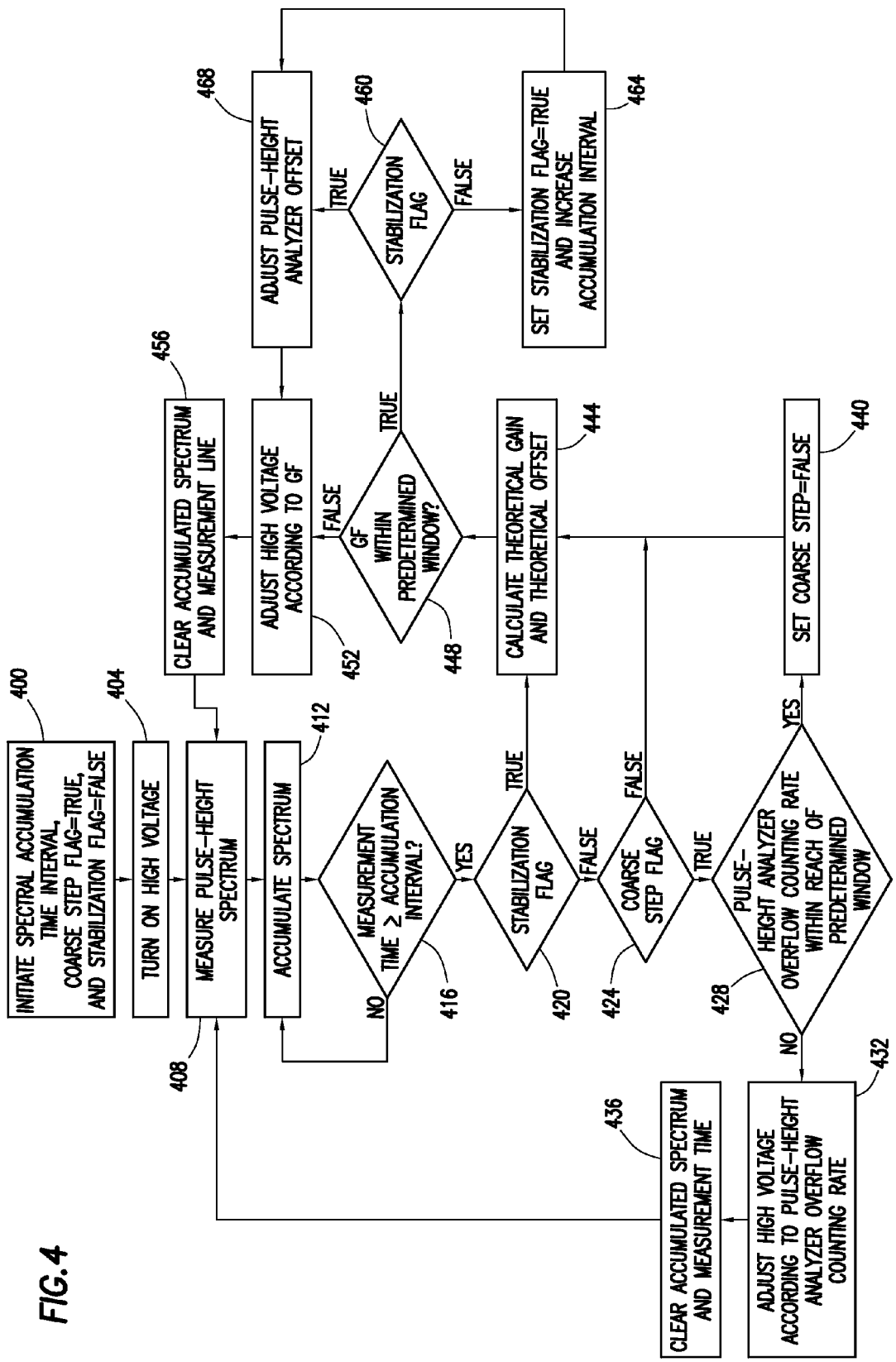
FIG. 4 shows a flow diagram of a method in accordance with at least some embodiments.

FIG. 4 illustrates a method in accordance with at least some embodiments, and which method may be implemented as a program executed by a processor. In some embodiments, the method illustrated by FIG. 4 may be implemented within the surface computer 22, which is able to communicate the processor 46 to control the various components within the tool. In other embodiments, the illustrative method may be implemented by a processor within the logging tool, such as for logging-while-drilling (LWD) and measuring-while-drilling (MWD) tools. The illustrative method of FIG. 4 may, for purposes of explanation, be logically divided into: a coarse adjustment phase; a fine adjustment phase; and a stabilization phase. Each of these illustrative phases will be discussed in turn.

The illustrative flow diagram of FIG. 4 starts by initializing a spectral accumulation time interval, asserting a coarse step flag, and de-asserting a stabilization flag (block 400). Thus, initially the method is in the coarse adjustment phase, as indicated by the assertion of the coarse step flag. High voltage is applied to the photomultiplier tube 44 (block 404), and in particular embodiments the initial voltage applied is at a level below the expected final voltage setting. The illustrative method proceeds with the acquisition or measurement of a pulse height spectrum (block 408). In particular embodiments, each pulse height spectrum comprises a count rate in each of a plurality of energy bins over a certain interval of time (e.g., 250 milli-seconds). The acquired pulse-height spectrum and measurement time are accumulated (block 412) for the spectral accumulation time interval (block 416). Stated otherwise, a plurality of pulse-height spectra are measured, and the counting rates in respective energy bins are summed to create the accumulated spectrum. In particular embodiments, the time of the accumulation time interval during the coarse adjustment phase is 10 to 15 seconds, but other times may be equivalently used. Accumulation of the pulse-height spectra (block 412) may occur during the release of neutrons in some cases; alternatively, when the source of neutrons is a neutron generator, the accumulation may occur during and after the release of neutrons has ceased.

Testing of the state of the stabilization flag (block 420) is a determination as to whether the illustrative method has entered the stabilization phase. On at least the initial pass, the stabilization phase has not been entered (block 420), and thus the illustrative flow diagram moves to testing the state of the coarse step flag (block 424). Testing the state of the coarse step flag (block 424) is a determination as to whether the illustrative method is still within the coarse phase. Assuming for now that the coarse step flag is asserted (again block 424), a determination is made as to whether the count rate of the overflow bin of the accumulated spectrum is within a predetermined window of count rate values (block 428). If the count rate of the overflow bin is not within a predetermined window, then the illustrative flow diagram moves to adjusting the high voltage to the photomultiplier tube according to the overflow bin count rate (block 432), clearing the accumulated spectrum (block 436), and again acquiring pulse height spectra (block 408) and accumulating the spectra (block 412). In particular embodiments, the amount the high voltage is adjusted (block 432) is proportional to an amount the count rate in the overflow bin is different than a predetermined count rate window. The illustrative method remains in the coarse adjustment phase (the left loop of the figure), each time making adjustments to the voltage applied to the photomultiplier tube (and thus the gain of the photomultiplier tube) until the count rate in the overflow bin reaches the predetermined window (e.g., between 15 and 100 counts per second).

When the count rate in the overflow bin reaches the predetermined window (again block 428), the illustrative method begins the fine adjustment phase. In particular, the coarse step flag is set to false (block 440) and then a theoretical gain value, and in some embodiments a theoretical offset value, are calculated based on the spectrum accumulated and a reference spectrum (block 444). In a particular embodiment, the relationship between the theoretical gain calculated and the current actual gain is shown by a "gain factor". More precisely, the gain factor is a value representative of the relationship between: 1) a theoretical photomultiplier gain that should achieve the "correct" spectrum; and 2) the current actual gain (indicated by the voltage applied to the photomultiplier tube). The "correct" spectrum is achieved when the gain factor equals one. Stated otherwise, if the gain factor equals one, the spectrum accumulated based on the current photomultipler gain correctly matches the reference spectrum. However, the actual voltage applied of the photomultiplier tube to achieve a gain factor of one may change from day-to-day and situation-to-situation (e.g., with changing temperature downhole, or age of the tool), and thus the gain factor is not consistently correlated to applied high voltage. The slope of the line that relates applied high voltage to gain factor, however, in many cases remains substantially constant so that when the calculated gain factor is not equal to one, an amount of change to the applied high voltage may be closely estimated. While the remaining description is based on the gain factor as the relative measure of the difference between the theoretical gain and actual gain, any measure that relates the theoretical gain calculated to the current actual gain may be equivalently used.

A determination is then made as to whether the gain factor is within a predetermined window of values (block 448). If the gain actor is not within the predetermined window, then an adjustment is made to the high voltage applied to the photomultiplier tube according to the gain factor (block 452). Thereafter, the accumulated spectrum is cleared (block 456), and a new spectrum is accumulated (blocks 408, 412 and 416). The illustrative method remains in the fine adjustment phase (center loop of the figure), accumulating spectra (blocks 408, 412 and 416), and making adjustments based on gain factor (blocks 444, 448, 452 and 456) until the gain factor falls within the predetermined window (block 448) (e.g., gain factor falls between and including the values of 0.995 and 1.005).

In some embodiments, once the gain factor falls within the predetermined window, the gain of the photomultiplier tube may be sufficiently calibrated that the illustrative method may simply end. Stated otherwise, the coarse adjustment phase and fine phase are sufficient in some cases, with no need to perform the stabilization phase. However, in other embodiments, and as illustrated, once the gain factor falls within the predetermined window (block 448), the illustrative method enters the stabilization phase. In particular, the first time that the gain factor falls within the predetermined window, the stabilization flag is still not asserted (block 460), and thus the method moves to asserting the stabilization flag and increasing the spectral accumulation time interval (block 464) (e.g., increasing the accumulation time interval to two minutes). Thereafter, the offset is adjusted (block 468) based on the theoretical offset calculated, the high voltage adjusted (block 452) based on the gain factor, the spectrum cleared (block 456), and the illustrative method again accumulates a spectrum (blocks 408, 412 and 416) with the increased accumulation interval. The next time the illustrative method reaches the determination regarding the stabilization flag (again block 460), the method moves directly to adjusting offset (block 468).

The illustrative method may remain in the stabilization phase (right loop of the figure) indefinitely, and particularly during actual operation, making adjustments to photomultiplier gain and offset of the A/D converter. In other embodiments, however, the stabilization phase may involve only adjustments to the voltage applied to the photomultiplier tube (based on the spectrum accumulated in the increased interval). Thus, the offset adjustment represented by block 468 may be omitted. In cases where offset correction is omitted, offset correction may be mathematically applied to the each accumulated spectrum based on offset correction determined during the inversion process.

As discussed in relation to FIG. 4 block 444, in at least some embodiments the illustrative method performs a mathematical analysis to determine a theoretical gain, and in some cases a theoretical offset. In some embodiments the mathematical analysis is a least-squares fit of the accumulated spectrum with respect to a reference spectrum. Based on the illustrative least-squares fitting procedure, the gain factor (which is based on the theoretical gain) is determined by minimizing a $\chi^2$ objective function involving a system of equations which represents the total spectral response as a linear combination of reference elemental responses, or spectral standards. This system of linear equations has the form:

$$y_1 = S_{11}x_1 + S_{12}x_2 + S_{13}x_3 + \ldots + S_{1m}x_m \quad (1)$$
$$y_2 = S_{21}x_1 + S_{22}x_2 + S_{23}x_3 + \ldots + S_{2m}x_m$$
$$y_3 = S_{31}x_1 + S_{32}x_2 + S_{33}x_3 + \ldots + S_{3m}x_m$$
$$\vdots \quad \vdots \quad \vdots \quad \vdots \quad \vdots \quad \vdots \quad \vdots \quad \vdots \quad \vdots \quad \vdots$$
$$y_n = S_{n1}x_1 + S_{n2}x_2 + S_{n3}x_3 + \ldots + S_{nm}x_m$$

where $y_i$ represents the total spectral responses in channel or bin i of the spectrum, $x_j$ is the elemental yield depicting the contribution of element j to the total response, and $S_{ij}$ is the reference spectral response in bin i to element j. The $x_j$ parameters are the unknowns for which the equations are solved. In matrix notation the system of equations becomes y=Sx.

The $\chi^2$ objective function is expressed as:

$$\chi^2 = \sum_i \frac{(y_i - m_i)^2}{v_i} \quad (2)$$

where $m_i$ is the measured response in channel or bin i, and $v_i$ is the variance of the measured response in bin i. In evaluating $\chi^2$ it is assumed the measured response is properly aligned with the reference spectrum and the energy resolution of the measured and reference spectrum are the same. To accommodate departures from these assumptions, the measured responses in the $\chi^2$ equation are transformations of actual accumulated responses (i.e., count rates) wherein adjustments for gain and channel offset have been applied. The gain of the actual spectrometer response is adjusted by 1/GF, thus in this context, GF represents the spectrometer's gain with respect to the desired nominal gain. A Gaussian broadening function is also applied to standard spectra having nominal energy resolution to account for differences between the energy resolution of the measured and standard spectra. The amount of Gaussian broadening applied is represented by a resolution factor, or RF.

The minimum $\chi^2$ occurs when its derivatives with respect to the variables, $x_i$, RF, GF, and channel offset are equal to zero. The solution which satisfies this condition may be found by invoking a solver code, such as NPSOL, which is capable of constraining the solution variables within reasonable boundary limits. The solver program NPSOL is available from Stanford Business Software, Inc. of Mountain View, Calif.

The illustrative embodiments exhibit several differences with respect to related-art methods. Unlike many of the related-art methods, the illustrative embodiments do not rely on a particular feature or photopeak being present in the measured spectrum to reliably calibrate the spectrometer. Further, the various embodiments do not require additional radioactive sources to produce a reference feature or photopeak(s), nor do the embodiments require additional hardware and electronics to perform methods such as coincidence/anti-coincidence spectroscopy. The various embodiments do not require the introduction of reference electrical signals to determine and correct for channel offset variations. Most the related-art methods assume appropriate operating parameters are known a priori when operation of the spectrometer is initiated. The various embodiments make no such assumptions and are able to determine the proper operating parameters regardless of whether the spectrometer is switched on in a wellbore logging environment or in a pre- and/or post-logging system check. Further still, calibration of the spectrometer can be achieved regardless whether the instrument is powered on in cased or un-cased portions of the wellbore.

As alluded to above, the various embodiments rely on the detection of gammas whose energy are above the energy range of interest for spectroscopy application. Gammas whose energy is less than approximately 9.5 MeV are of interest in neutron-induced gamma spectroscopy applications for purposes of formation evaluation. However, gammas are produced from neutron capture reactions that exceed the energy range of interest, and are therefore useful in the calibration of the various embodiments. For example, the 10.2 MeV gammas produced from the absorption of thermal neutrons by $^{73}$Ge in bismuth germinate scintillation crystals contribute to the overflow bin counting rate. Therefore, logging tools with larger bismuth germinate scintillation crystals will produce a larger contribution to the overflow bin counting rate. As yet another example, the pressure vessel components also contribute to the overflow bin counting rate. Although the compositions of pressure vessel may vary from tool-to-tool, and from one company to another, most contain appreciable amounts of at least one of the following elements: iron, chromium and nickel. Each of these elements produces low-intensity gamma rays above 9.5 MeV from thermal neutron capture reactions. For example, the $^{57}$Fe (n,γ) reaction produces ~2.7 10.04-MeV gamma rays per 100 reactions, the $^{53}$Cr (n,γ) reaction produces ~14.6 9.72-MeV gamma rays per 100 reactions and the $^{61}$Ni (n,γ) reaction produces ~3.7 10.59-MeV gamma rays per 100 reactions. Contributions from the illustrative reactions depends on the composition of the pressure vessel, and the overall effect is diluted since $^{57}$Fe, $^{53}$Cr, and $^{61}$Ni account for 2, 1.3, and 9.3%, respectively, of naturally occurring iron, chromium and nickel. Nonetheless, the pressure vessel contributes to the overflow bin counting rate in most implementations.

Figure 5:
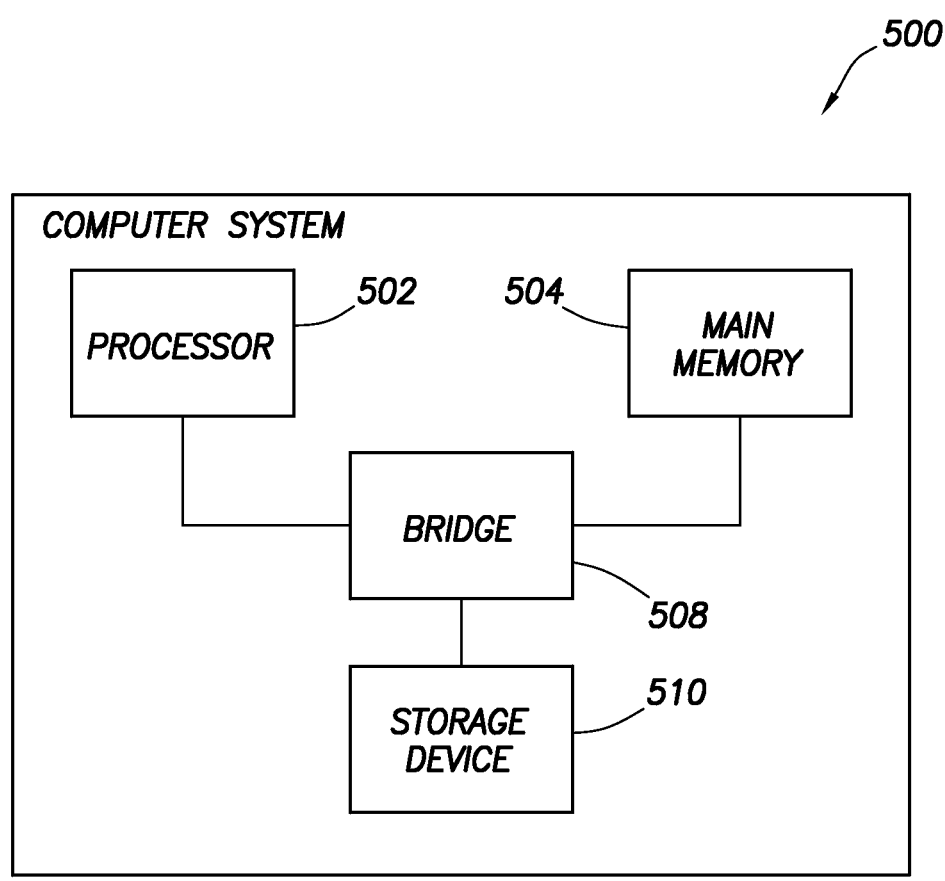
FIG. 5 shows a computer system in accordance with at least some embodiments.

FIG. 5 illustrates in greater detail a computer system 500, which is illustrative of a computer system upon which the various embodiments may be practiced. The computer system 500 may be, for example, surface computer system 22, or the computer system 500 may reside within the pressure vessel for MWD and LWD applications. The computer system 500 comprises a processor 502, and the processor couples to a main memory 504 by way of a bridge device 508. Moreover, the processor 502 may couple to a long term storage device 510 (e.g., a hard drive, "floppy" disk, memory stick) by way of the bridge device 508. Programs executable by the processor 502 may be stored on the storage device 510, and accessed when needed by the processor 502. The program stored on the storage device 510 may comprise programs to implement the various embodiments of the present specification, including programs to implement calibration of the logging tool. In some cases, the programs are copied from the storage device 510 to the main memory 504, and the programs are executed from the main memory 504. Thus, both the main memory 504 and storage device 510 shall be considered computer-readable storage mediums. The results of the modeling by the computer system 500 may be sent to a display device which may make a representation for viewing by a geologist or other person skilled in the art.

From the description provided herein, those skilled in the art are readily able to combine software created as described with appropriate computer hardware to create a special purpose computer system and/or special purpose computer sub-components in accordance with the various embodiments, to create a special purpose computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, during the coarse phase of the illustrative method of FIG. 4, the count rate only in the overflow bin may be accumulated. Moreover, while discussed in the context of a wire-line logging tool, the various embodiments also find application in MWD and LWD applications, and thus the discussion with respect to a wire-line tool shall not be construed as a limitations as to the applicability of the various embodiments. It is intended that the following claims be interpreted to embrace all such variations and modifications.

What is claimed is:

1. A computer-readable storage medium storing a program that, when executed by a processor, causes the process to:
   calibrate a logging tool, the instructions causing the processor to:
     set gain of a photomultiplier tube of the logging tool to a setting different than a final gain setting;
     determine, based on a gamma detector of the logging tool, a count rate of gammas having energy above a predetermined energy; and then modify the gain of the photomultiplier tube proportional to an amount the count rate of gammas is different than a predetermined threshold; and then repeat the creation of the neutron flux, determination of the count rate and modification of the gain until the count rate reaches the predetermined threshold.

2. The computer-readable storage medium of claim 1 wherein after the gain is within the predetermined threshold, the program further causes the processor to:

determine a plurality of count rates one count rate for each bin of a plurality of energy bins;

calculate a theoretical gain value based on the plurality of count rates and a reference plurality of count rates; and then adjust the gain of the photomultiplier tube based on the theoretical gain value.

3. The computer-readable storage medium of claim 2 wherein:

when the processor calculates the theoretical gain, the program further causes the processor to calculate a theoretical offset; and when the processor adjusts the gain, the program further causes the processor to adjust the offset of an analog-to-digital converter coupled to the photomultiplier tube based on the theoretical offset.

4. The computer-readable storage medium of claim 1 wherein the program, prior to the determination of the count rate above the predetermined energy, further causes the processor to set the gain of the photomultiplier tube below an expected final gain setting.

5. A logging tool comprising:

a pressure vessel;

a source of neutrons disposed within the pressure vessel;

a gamma detector disposed within the pressure vessel, the gamma detector comprising:

a scintillation crystal;

a photomultiplier tube in operational relationship to the scintillation crystal, the photomultiplier tube has a voltage input, and gain of the photomultiplier tube is responsive to the voltage applied to the voltage input;

an analog-to-digital (ND) converter coupled to the photomultiplier tube;

a computer system coupled to the gamma detector, the computer system comprising a processor and a memory, the memory stores a program that, when executed by the processor, causes the processor to:

set the voltage applied to the voltage input of the photomultiplier tube to a setting different than a final voltage setting for the logging tool after calibration;

read a count rate of gammas having above a predetermined energy by way of the gamma detector; and then modify the voltage applied to the voltage input of the photomultiplier tube, the modification proportional to an amount the count rate of gammas is different than a predetermined count rate.

6. The logging tool of claim 5 wherein the program further causes the processor to repeat read of count rate and modification of the voltage until the count rate is within a predetermined range of the predetermined count rate.

7. The logging tool of claim 5 wherein the program further causes the processor to:

read count rates of gammas for a plurality of energy bins;

calculate a theoretical gain value that mathematically fits the plurality of count rates to a reference spectrum; and modify the voltage applied to the voltage input of the photomultiplier tube, the modification proportional to the theoretical gain value.

8. The logging tool of claim 7 wherein the program further causes the processor to:

when the processor calculates the theoretical gain value, the program further causes the processor to calculate a theoretical offset value; and the program further causes the processor to adjust the offset of the A/D converter based on the theoretical offset value.

9. The logging tool of claim 5 where when the processor sets the voltage, the program further causes the processor to set the voltage applied to the voltage input below the expected voltage setting.

10. The logging tool of claim 5 wherein the computer system is disposed within the pressure vessel.

11. The logging tool of claim 5 wherein the pressure vessel is suspending by way of a cable, and the computer system couples to the source of neutrons and gamma detector by way of the cable.

* * * * *